(No Model.)

E. E. WILSON.
FISHING TACKLE FLOAT.

No. 584,615. Patented June 15, 1897.

Witnesses.
E. B. Gilchrist
N. N. Rankin

Inventor,
Elmer E. Wilson
By E. L. Thurston
his attorney

UNITED STATES PATENT OFFICE.

ELMER E. WILSON, OF COFFEYVILLE, KANSAS.

FISHING-TACKLE FLOAT.

SPECIFICATION forming part of Letters Patent No. 584,615, dated June 15, 1897.

Application filed November 18, 1896. Serial No. 612,607. (No model.)

*To all whom it may concern:*

Be it known that I, ELMER E. WILSON, a citizen of the United States, residing at Coffeyville, in the county of Montgomery and State of Kansas, have invented certain new and useful Improvements in Fishing-Tackle Floats; and I do hereby declare the following to be a full, clear, and exact description of the invention, such as will enable others skilled in the art to which it appertains to make and use the same.

One object of my invention is to provide a float which may be easily and quickly fixed at any desired point upon the fishing-line.

Another object is to construct a float in such manner that the fishing-line may be wound up neatly within the float, thereby making a convenient package to carry and preventing the tangling of the line.

The invention consists in the float embodying the combination of parts hereinafter described, and pointed out definitely in the claims.

Figure 1:
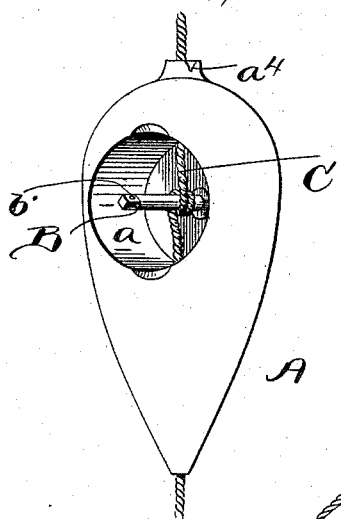
Figure 2:
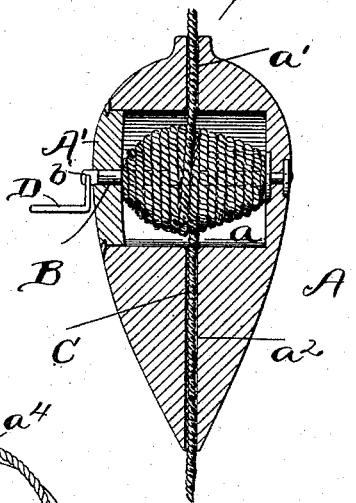
Figure 3:
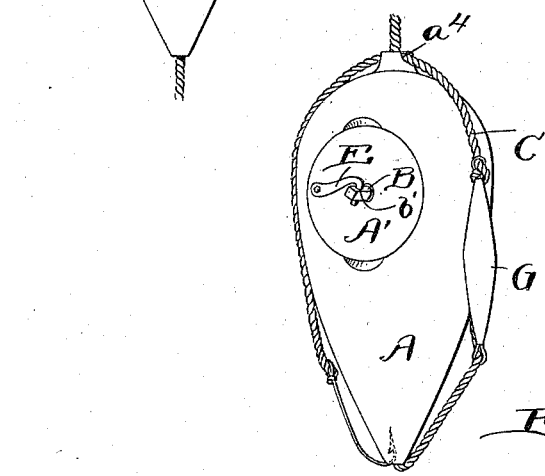
Figure 4:
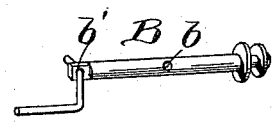

In the drawings, Figure 1 is a perspective view of my improved float when the cap which closes the cavity is removed and when the line is wound a turn or two upon the shaft, in which position of the parts the float will be locked to the line if the rotation of the shaft is prevented. Fig. 2 is a central sectional view when the line is wound upon the shaft. Fig. 3 is a perspective view when the float and other parts of the tackle are in position to be conveniently carried, and Fig. 4 is a perspective view of the shaft and crank.

Referring to the parts by letter, A represents a float which contains a transverse cavity $a$, open at one end and extending nearly through the float. A longitudinal hole $a'$ extends from the top of the float to this cavity, and another longitudinal hole $a^2$ extends from the bottom of the float to this cavity. A transverse shaft B is journaled in the end wall of the cavity, and it extends through a hole in a cap or plug A', which fits in the open end of the cavity, whereby the end of the shaft is supported in a suitable bearing.

The line C passes through the holes $a'$ $a^2$, across the cavity, and through a hole $b$ in the shaft.

In the projecting end of the shaft is a transverse hole $b'$, which serves two purposes—viz., it receives the end of a bent-wire crank D, which may be used to rotate the shaft and thereby wind the line from both directions upon said shaft, and it receives the end of a locking-hook E, which is pivoted to the float, preferably to the cap A', which forms a part of said float. This hook, when engaging with the shaft, prevents the shaft from rotating, and thus locks together the line and float, however much or little of said line may be wound upon the shaft.

The manner of using the described float and the advantages resulting from such use will be apparent from the following statement: When one has finished using the fishing-tackle, the float is moved to approximately the middle of the line, the crank D is inserted, and the shaft B rotated thereby. This winds the line upon the shaft from both directions in the cavity $a$. The point of the hook may be inserted in the end of hole $a^2$, and the line passed around the float, lying in a notch $a^4$ in the top thereof, when the sinker G will lie against the side of the float. The shaft is turned until the line is drawn tight, and the shaft is locked by the hook E after the crank has been taken off. The line is now neatly wound up in the cavity, and the entire tackle makes a small package which may be conveniently carried in the fisherman's pocket.

When it is desired to use the tackle, the locking-hook is withdrawn and the line is pulled out from both ends of the float until it is entirely unwound. The float is then slipped upon the line until it is at the desired distance from the hook, after which the shaft is turned two or three times around and then locked by the locking-hook E.

Having described my invention, I claim—

1. The combination of a fishing-tackle float having a transverse cavity, and holes through the top and bottom to this cavity, with a transverse rotatable shaft extending through said cavity, having a projecting end in which a hole is formed, and a locking-hook pivoted to the float for engagement in said hole, substantially as and for the purpose specified.

2. The combination of a fishing-tackle float having a transverse cavity open at one end and extending nearly across the float, and holes through the ends to this cavity, with a cap for closing the end of the transverse cavity, a transverse rotatable shaft journaled in the end wall of the cavity and in said cap, said shaft having within the cavity a hole for the passage of the line, said shaft having also one end extending out of the cavity and provided with a hole, and a locking-hook pivoted to the float for engagement in said hole, substantially as and for the purpose specified.

3. The combination of a fishing-tackle float having a transverse cavity extending through one side and near to the other side, and holes through the ends to said cavity, with a cap for closing the end of said cavity, a transverse shaft journaled in the end wall of the cavity and passing through the cap, said shaft having, in the cavity, a hole for the passage of the line, and a locking device for preventing the revolution of the shaft, substantially as and for the purpose specified.

In testimony whereof I affix my signature in presence of two witnesses.

ELMER E. WILSON.

Witnesses:
 EDGAR GREEN,
 O. T. ROMIG.